United States Patent
Ohashi

(10) Patent No.: US 6,750,990 B1
(45) Date of Patent: Jun. 15, 2004

(54) IMAGE SCANNING APPARATUS, IMAGE FORMING APPARATUS, IMAGE FORMING SYSTEM, IMAGE SCANNING CONTROL METHOD, AND STORAGE MEDIUM

(75) Inventor: Kazuhito Ohashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 09/713,697

(22) Filed: Nov. 15, 2000

(30) Foreign Application Priority Data

Nov. 16, 1999 (JP) .......................................... 11-325379

(51) Int. Cl.⁷ ................................................ H04N 1/04
(52) U.S. Cl. ....................... 358/496; 358/471; 358/474; 358/494
(58) Field of Search ................................ 358/496, 471, 358/474, 494, 1.9; 250/208.1

(56) References Cited

U.S. PATENT DOCUMENTS

| 5,969,372 A | 10/1999 | Stavely et al. ......... 250/559.42 |
| 6,292,269 B1 | 9/2001 | Kawai ......................... 358/1.9 |

FOREIGN PATENT DOCUMENTS

| JP | 62014577 A | * 1/1987 | ............ H04N/1/40 |
| JP | 2-96464 | 4/1990 | |
| JP | 6-233062 | 8/1990 | |
| JP | 11-098329 | 4/1999 | ............ H04N/1/19 |
| JP | 11-164147 | 6/1999 | ............ H04N/1/40 |
| JP | 11184174 A | * 7/1999 | .......... G03G/15/00 |

OTHER PUBLICATIONS

European Search Report, EP 00 12 4942.

* cited by examiner

Primary Examiner—Edward Coles
Assistant Examiner—Heather D Gibbs
(74) Attorney, Agent, or Firm—Morgan & Finnegan, LLP

(57) ABSTRACT

Since an apparatus has a linear image sensor for scanning an image at the stop position of a mirror table from a document that moves at a constant speed, a black stripe image detection circuit for detecting the presence/absence of generation of a black stripe image on the basis of an image signal, and a CPU for determining that dust or soil is attached to the surface of the platen glass upon detection of generation of the black stripe image, and making control for changing the stop position of the mirror table and control for displaying a warning message, any black stripe generated due to dust or soil on the platen glass surface is detected in the sheetfed scanning mode, and the control for changing the sheetfed scan position or the control for displaying a warning message indicating that dust or soil is attached to the platen glass surface is done in accordance with the detection result, thus reducing the frequency of occurrence of generation of a black stripe compared to a conventional apparatus.

23 Claims, 15 Drawing Sheets

MAIN-SCAN BLACK SIGNAL THICKENING CIRCUIT

FIG. 11
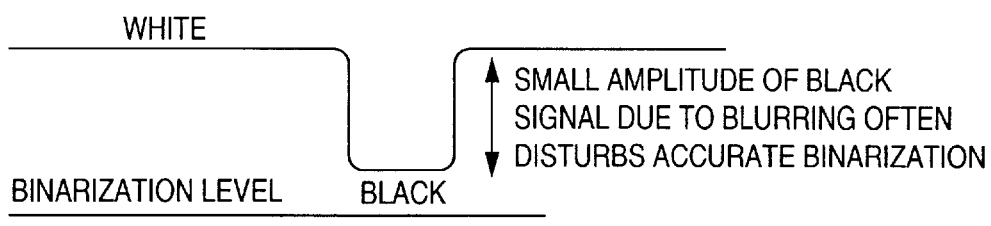
EDGE EMPHASIS
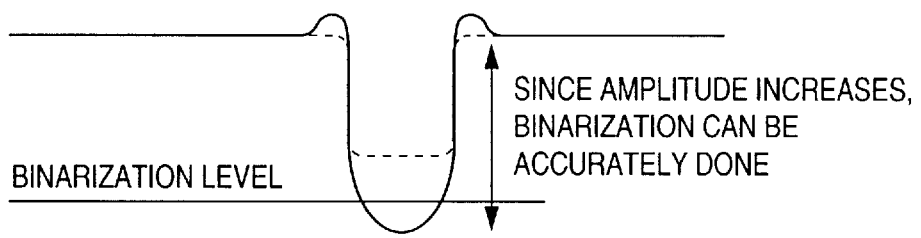

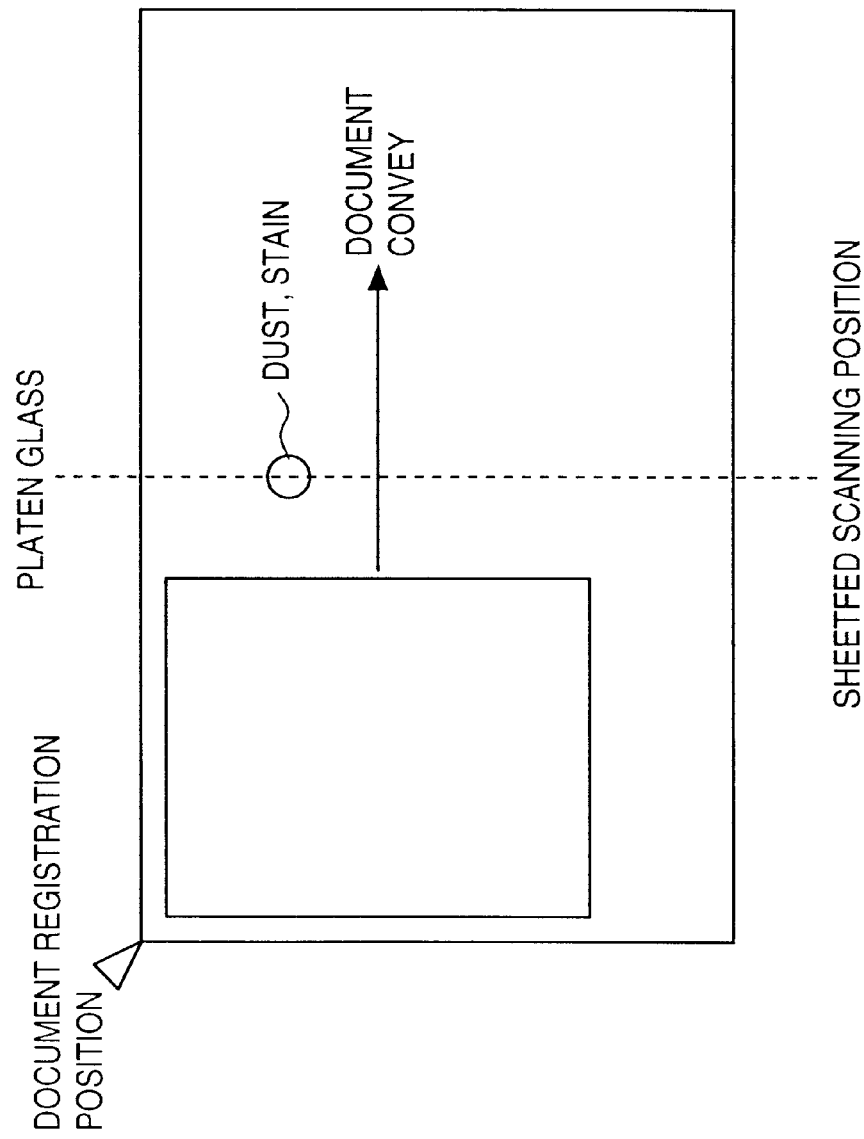

IMAGE SCANNING APPARATUS, IMAGE FORMING APPARATUS, IMAGE FORMING SYSTEM, IMAGE SCANNING CONTROL METHOD, AND STORAGE MEDIUM

FIELD OF THE INVENTION

The present invention relates to an image scanning apparatus, image forming apparatus, image forming system, image scanning control method, and storage medium and, more particularly, to an image scanning apparatus which can make generation of a black stripe image due to dust harder when sheetfed scans are made using a combination of a linear image sensor and an automatic document feeder attached to the image scanning apparatus, an image forming apparatus, an image forming system, an image scanning control method, and a storage medium.

BACKGROUND OF THE INVENTION

Conventionally, an image scanning apparatus with a linear image sensor has an arrangement shown in, e.g., FIG. 13. FIG. 13 is a block diagram showing an example of the arrangement of a conventional image scanning apparatus. Referring to FIG. 13, reference numeral 101 denotes a document illumination lamp; 102 to 104, first to third mirrors; 105, a lens; 106, a linear image sensor; 107, a platen glass; 108, a document; 109, a white plate serving as a reference for shading correction; and 110, a dummy glass. The image scanning apparatus shown in FIG. 13 can two-dimensionally scan the document 108 by moving (sub-scanning) the first to third mirrors 102 to 104 and the document illumination lamp 101 in the direction of an arrow.

FIG. 14 is a block diagram showing an example of the arrangement when an automatic document feeder is attached to the conventional image scanning apparatus shown in FIG. 13. An automatic document feeder 200 comprises an automatic document feeding conveyor belt 202, driving roller 203, and document loader 204, and conveys a document 201 loaded on the document loader 204 by rotating the automatic document feeding conveyor belt 202 by the driving roller 203.

As an image scanning mode that uses the aforementioned image scanning apparatus and automatic document feeder, a "sheetfed scanning" mode is known. In the "sheetfed scanning mode", the image scanning apparatus moves the mirrors to scan a predetermined position of the platen glass, and the automatic document feeder moves a document at a given speed in that state, thereby scanning an image of the document. That position on the platen glass which is scanned by the image scanning apparatus is called a "sheetfed scanning position", and is constant, as indicated by the broken line in FIG. 15. On the other hand, the automatic document feeder moves a document in the direction of an arrow in FIG. 15. In this sheetfed scanning mode, since the document need only be moved in a given direction, the time interval required between neighboring documents upon successively scanning a large number of documents is shorter than that required in the normal scan.

However, the aforementioned prior art suffers the following problem. That is, in the sheetfed scanning mode, if dust, soil, or the like is present on a portion of the platen glass, as shown in FIG. 15, a black stripe forms at the corresponding main scan position of the scanned image. However, as a conventional method of preventing a black stripe from forming, the platen glass surface can only be cleaned.

SUMMARY OF THE INVENTION

The present invention has been proposed to solve the conventional problems, and has as its object to provide an image scanning apparatus which detects generation of a black stripe formed due to dust, soil, or the like on a platen glass in the sheetfed scanning mode, and makes control for changing the sheetfed scanning position or displays a warning indicating that dust or soil is attached to the platen glass in accordance with the detection result, thus reducing the frequency of occurrence of generation of a black stripe, an image forming apparatus, an image forming system, an image scanning control method, and a storage medium.

In order to achieve the above object, an image scanning apparatus for scanning an image while moving a document on a platen glass at a constant speed, comprises black stripe image detection means for detecting the presence/absence of generation of a black stripe image on the basis of an image signal obtained by the image scan, and control means for, when the black stripe image detection means detects generation of the black stripe image, determining that dust or soil is attached to a surface of the platen glass, and making control for changing a stop position of an optical system for guiding light reflected by the document to an image scanning system in the image scan.

According to a preferred aspect of the present invention, the apparatus further comprises document moving means for moving the document on the platen glass in a sub-scan direction at a constant speed, optical system moving means for moving/stopping a mirror table, that supports a reflected light guide mirror as the optical system, to scan a predetermined position on the platen glass, document illumination means for illuminating the document, that moves along the surface of the platen glass, at a stop position of the mirror table, and image scanning means serving as the image scanning system for scanning the image from the document, which moves at the constant speed, at the stop position of the mirror table.

According to a preferred aspect of the present invention, the black stripe image detection means comprises binarization means for binarizing image data scanned by the image scanning means, accumulation means for accumulating the binary data for a predetermined number of lines at N-line intervals (N: an arbitrary integer) in units of pixels, and comparison means for comparing the accumulation result with a predetermined determination level, and determining that a black stripe image is generated at the corresponding pixel position when the accumulation result has exceeded the determination level.

According to a preferred aspect of the present invention, the black stripe image detection means comprises black signal thickening means for selecting and outputting one with a smaller level of signals obtained before and after image data scanned by the image scanning means is delayed by a predetermined number of pixels in a main scan direction, binarization means for binarizing data scanned output from the black signal thickening means, accumulation means for accumulating the binary data for a predetermined number of lines at N-line intervals (N: an arbitrary integer) in units of pixels, and comparison means for comparing the accumulation result with a predetermined determination level, and determining that a black stripe image is generated at the corresponding pixel position when the accumulation result has exceeded the determination level.

According to a preferred aspect of the present invention, a timing at which the black stripe image detection means detects the presence/absence of generation of the black stripe image is set before a document scan by the image scanning means, and the black stripe image detection means detects the presence/absence of generation of the black stripe image using image data scanned at the predetermined position on the platen glass by the image scanning means while moving a belt surface of a document conveyor belt that forms the document moving means by the control means.

According to a preferred aspect of the present invention, a timing at which the black stripe image detection means detects the presence/absence of generation of the black stripe image is set after a document scan by the image scanning means, and the black stripe image detection means detects the presence/absence of generation of the black stripe image using image data scanned at the predetermined position on the platen glass by the image scanning means while moving a belt surface of a document conveyor belt that forms the document moving means by the control means.

According to a preferred aspect of the present invention, a timing at which the black stripe image detection means detects the presence/absence of generation of the black stripe image is set between neighboring documents upon successively scanning documents by the image scanning means, and the black stripe image detection means detects the presence/absence of generation of the black stripe image using image data scanned at the predetermined position on the platen glass by the image scanning means while moving a belt surface of a document conveyor belt that forms the document moving means by the control means.

According to a preferred aspect of the present invention, the apparatus further comprises warning means for generating a warning message indicating that dust or soil is attached to the surface of the platen glass when the black stripe image detection means detects generation of the black stripe image.

In an image forming apparatus which mounts an image scanning apparatus for scanning an image while moving a document on a platen glass at a constant speed, and forms an image on a recording medium such as a recording sheet or the like on the basis of the scanned image, the image scanning apparatus comprises black stripe image detection means for detecting the presence/absence of generation of a black stripe image on the basis of an image signal obtained by the image scan, and control means for, when the black stripe image detection means detects generation of the black stripe image, determining that dust or soil is attached to a surface of the platen glass, and making control for changing a stop position of an optical system for guiding light reflected by the document to an image scanning system in the image scan.

In an image forming system that connects an image forming apparatus which mounts an image scanning apparatus for scanning an image while moving a document on a platen glass at a constant speed, and forms an image on a recording medium such as a recording sheet or the like on the basis of the scanned image, and an external apparatus such as an information processing apparatus or the like, the image scanning apparatus mounted in the image forming apparatus comprises black stripe image detection means for detecting the presence/absence of generation of a black stripe image on the basis of an image signal obtained by the image scan, and control means for, when the black stripe image detection means detects generation of the black stripe image, determining that dust or soil is attached to a surface of the platen glass, and making control for changing a stop position of an optical system for guiding light reflected by the document to an image scanning system in the image scan.

An image scanning control method applied to an image scanning apparatus for scanning an image while moving a document on a platen glass at a constant speed, comprises the black stripe image detection step of detecting the presence/absence of generation of a black stripe image on the basis of an image signal obtained by the image scan, and the control step of, when generation of the black stripe image is detected in the black stripe image detection step, determining that dust or soil is attached to a surface of the platen glass, and making control for changing a stop position of an optical system for guiding light reflected by the document to an image scanning system in the image scan.

According to a preferred aspect of the present invention, the method further comprises the document moving step of moving the document on the platen glass in a sub-scan direction at a constant speed, the optical system moving step of moving/stopping a mirror table, that supports a reflected light guide mirror as the optical system, to scan a predetermined position on the platen glass, the document illumination step of illuminating the document, that moves along the surface of the platen glass, at a stop position of the mirror table, and the image scanning step of scanning the image by the image scanning system from the document, which moves at the constant speed, at the stop position of the mirror table.

According to a preferred aspect of the present invention, the black stripe image detection step comprises the binarization step of binarizing image data scanned in the image scanning step, the accumulation step of accumulating the binary data for a predetermined number of lines at N-line intervals (N: an arbitrary integer) in units of pixels, and the comparison step of comparing the accumulation result with a predetermined determination level, and determining that a black stripe image is generated at the corresponding pixel position when the accumulation result has exceeded the determination level.

According to a preferred aspect of the present invention, the black stripe image detection step comprises the black signal thickening step of selecting and outputting one with a smaller level of signals obtained before and after image data scanned in the image scanning step is delayed by a predetermined number of pixels in a main scan direction, the binarization step of binarizing data output from the black signal thickening step, the accumulation step of accumulating the binary data for a predetermined number of lines at N-line intervals (N: an arbitrary integer) in units of pixels, and the comparison step of comparing the accumulation result with a predetermined determination level, and determining that a black stripe image is generated at the corresponding pixel position when the accumulation result has exceeded the determination level.

According to a preferred aspect of the present invention, a timing at which the presence/absence of generation of the black stripe image is detected in the black stripe image detection step is set before a document scan in the image scanning step, and the presence/absence of generation of the black stripe image is detected in the black stripe image detection step using image data scanned at the predetermined position on the platen glass in the image scanning step while moving a belt surface of a document conveyor belt used in the document moving step in the control step.

According to a preferred aspect of the present invention, a timing at which the presence/absence of generation of the black stripe image is detected in the black stripe image detection step is set after a document scan in the image scanning step, and the presence/absence of generation of the black stripe image is detected in the black stripe image detection step using image data scanned at the predetermined position on the platen glass in the image scanning step while moving a belt surface of a document conveyor belt used in the document moving step in the control step.

According to a preferred aspect of the present invention, a timing at which the presence/absence of generation of the black stripe image is detected in the black stripe image detection step is set between neighboring documents upon successively scanning documents in the image scanning step, and the presence/absence of generation of the black stripe image is detected in the black stripe image detection step using image data scanned at the predetermined position on the platen glass in the image scanning step while moving a belt surface of a document conveyor belt used in the document moving step in the control step.

According to a preferred aspect of the present invention, the method further comprises the warning step of generating a warning message indicating that dust or soil is attached to the surface of the platen glass when generation of the black stripe image is detected in the black stripe image detection step.

In a computer readable storage medium which stores a program module for executing an image scanning control method applied to an image scanning apparatus for scanning an image while moving a document on a platen glass at a constant speed, the program module comprises a black stripe image detection module for controlling to detect the presence/absence of generation of a black stripe image on the basis of an image signal obtained by the image scan, and a control module for, when generation of the black stripe image is detected by the black stripe image detection module, determining that dust or soil is attached to a surface of the platen glass, and controlling to change a stop position of an optical system for guiding light reflected by the document to an image scanning system in the image scan.

According to a preferred aspect of the present invention, the program module further comprises a document moving module for controlling to move the document on the platen glass in a sub-scan direction at a constant speed, an optical system moving module for controlling to move/stop a mirror table, that supports a reflected light guide mirror as the optical system, to scan a predetermined position on the platen glass, a document illumination module for controlling to illuminate the document, that moves along the surface of the platen glass, at a stop position of the mirror table, and an image scanning module for controlling to scan the image by the image scanning system from the document, which moves at the constant speed, at the stop position of the mirror table.

According to a preferred aspect of the present invention, the black stripe image detection module comprises a binarization module for controlling to binarize image data scanned by the image scanning module, an accumulation module for controlling to accumulate the binary data for a predetermined number of lines at N-line intervals (N: an arbitrary integer) in units of pixels, and a comparison module for comparing the accumulation result with a predetermined determination level, and controlling to determine that a black stripe image is generated at the corresponding pixel position when the accumulation result has exceeded the determination level.

According to a preferred aspect of the present invention, the black stripe image detection module comprises a black signal thickening module for controlling to select and output one with a smaller level of signals obtained before and after image data scanned by the image scanning module is delayed by a predetermined number of pixels in a main scan direction, a binarization module for controlling to binarize data output from the black signal thickening module, an accumulation module for controlling to accumulate the binary data for a predetermined number of lines at N-line intervals (N: an arbitrary integer) in units of pixels, and a comparison module for comparing the accumulation result with a predetermined determination level, and controlling to determine that a black stripe image is generated at the corresponding pixel position when the accumulation result has exceeded the determination level.

According to a preferred aspect of the present invention, a timing at which the black stripe image detection module detects the presence/absence of generation of the black stripe image is set before a document scan by the image scanning module, and the presence/absence of generation of the black stripe image is detected by the black stripe image detection module using image data scanned at the predetermined position on the platen glass by the image scanning module while moving a belt surface of a document conveyor belt used in the document moving module by the control module.

According to a preferred aspect of the present invention, a timing at which the black stripe image detection module detects the presence/absence of generation of the black stripe image is set after a document scan by the image scanning module, and the presence/absence of generation of the black stripe image is detected by the black stripe image detection module using image data scanned at the predetermined position on the platen glass by the image scanning module while moving a belt surface of a document conveyor belt used in the document moving module by the control module.

According to a preferred aspect of the present invention, a timing at which the black stripe image detection module detects the presence/absence of generation of the black stripe image is set between neighboring documents upon successively scanning documents by the image scanning module, and the presence/absence of generation of the black stripe image is detected by the black stripe image detection module using image data scanned at the predetermined position on the platen glass by the image scanning module while moving a belt surface of a document conveyor belt used in the document moving module by the control module.

According to a preferred aspect of the present invention, the program module further comprises a warning module for controlling to generate a warning message indicating that dust or soil is attached to the surface of the platen glass when the black stripe image detection module detects generation of the black stripe image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a waveform chart for explaining an edge emphasis process in the image scanning apparatus according to the second embodiment of the present invention;

FIG. 15 is an explanatory view showing the sheetfed scanning position on a platen glass of the conventional image scanning apparatus.

DETAILED DESCRIPTION OF THE PREFERRED EMBODIMENTS

Preferred embodiments of the present invention will now be described in detail in accordance with the accompanying drawings.

First Embodiment

Figure 1:
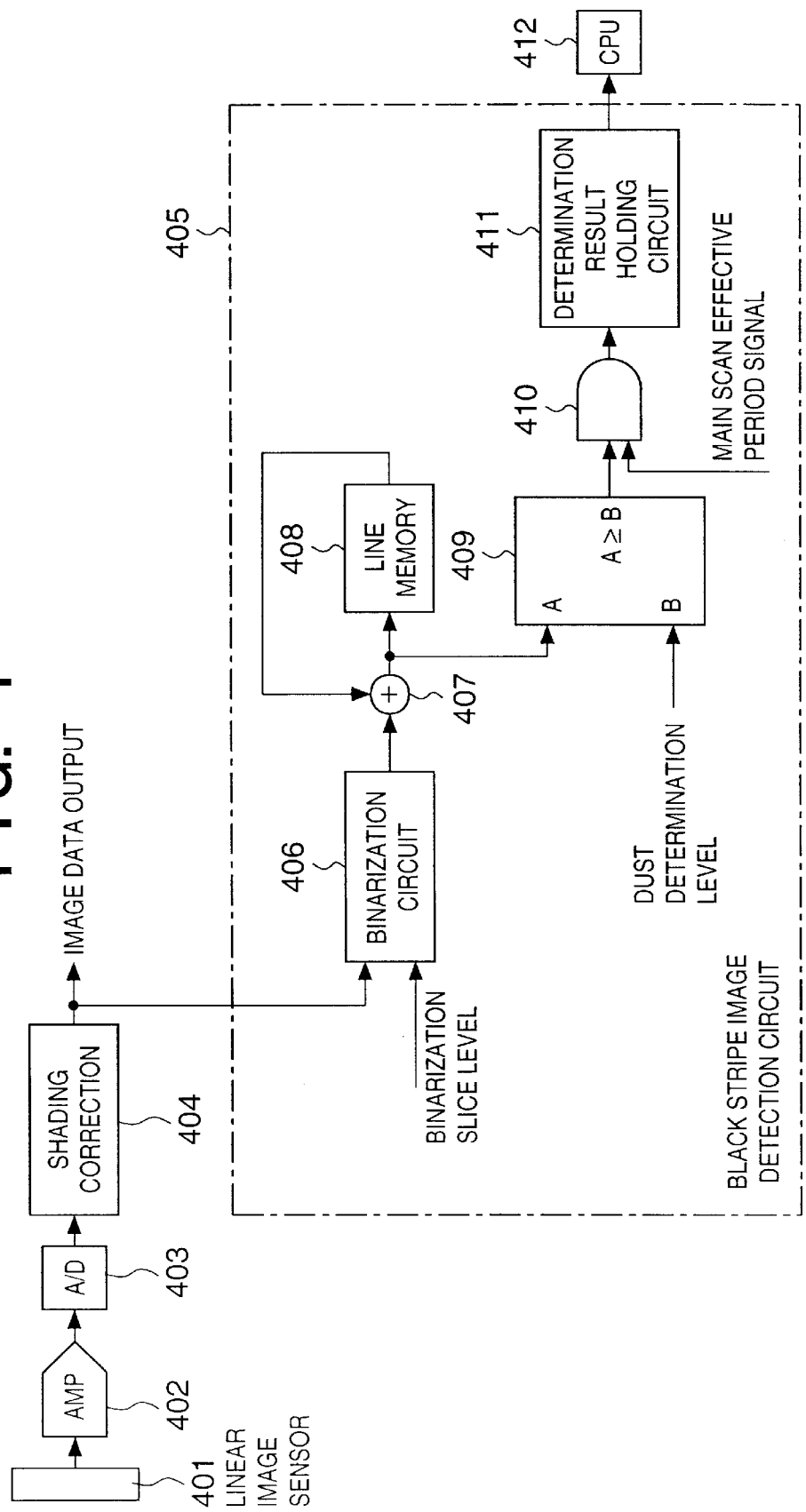
FIG. 1 is a block diagram showing an example of the arrangement of a control system including a black stripe image detection circuit in an image scanning apparatus according to the first embodiment of the present invention.

FIG. 1 is a block diagram showing an example of the arrangement of a control system including a black stripe image detection circuit in an image scanning apparatus according to the first embodiment of the present invention. The control system of the image scanning apparatus according to the first embodiment of the present invention mainly comprises a linear image sensor 401, amplifier 402, A/D converter 403, shading correction circuit 404, black stripe image detection circuit 405, and CPU 412. Furthermore, the black stripe image detection circuit 405 comprises a binarization circuit 406, adder 407, line memory 408, comparator 409, gate circuit 410, and determination result holding circuit 411.

The functions of the respective units will be described below. The linear image sensor 401 makes photoelectric conversion based on light reflected by a document, and outputs an electrical signal. The amplifier 402 amplifies a signal output from the linear image sensor 401 at a predetermined gain. The A/D converter 403 converts an analog signal output from the amplifier 402 into a digital signal. The shading correction circuit 404 performs shading correction on the basis of the output from the A/D converter 403, and outputs an image signal that has undergone shading correction to the binarization circuit 406 of the black stripe image detection circuit 405 as a scanned image signal. The binarization circuit 406 converts the shading-corrected image signal into a binary signal by comparing it with a predetermined binary slice level.

The adder 407 adds the output from the binarization circuit 406 and the output from the line memory 408. The line memory 408 stores data that pertains to accumulation of each pixel. The comparator 409 compares the accumulated value of each pixel with a predetermined dust determination level, and determines generation of a black stripe for a pixel, the value of which has exceeded the predetermined dust determination level. The gate circuit 410 outputs only period signal components of an effective region used for a document scan in a scanning region to the determination result holding circuit 411. When generation of a black stripe is determined even for only one pixel in the effective period, the determination result holding circuit 411 outputs black stripe generation information to the CPU 412. Upon receiving black stripe generation information, the CPU 412 makes control for changing the sheetfed scanning position or control for displaying a warning of dust or soil on the platen glass, and controls execution of the processes shown in the flow charts of FIGS. 2 and 3, and the flow chart in FIG. 4 on the basis of a program of the present invention.

Figure 4:
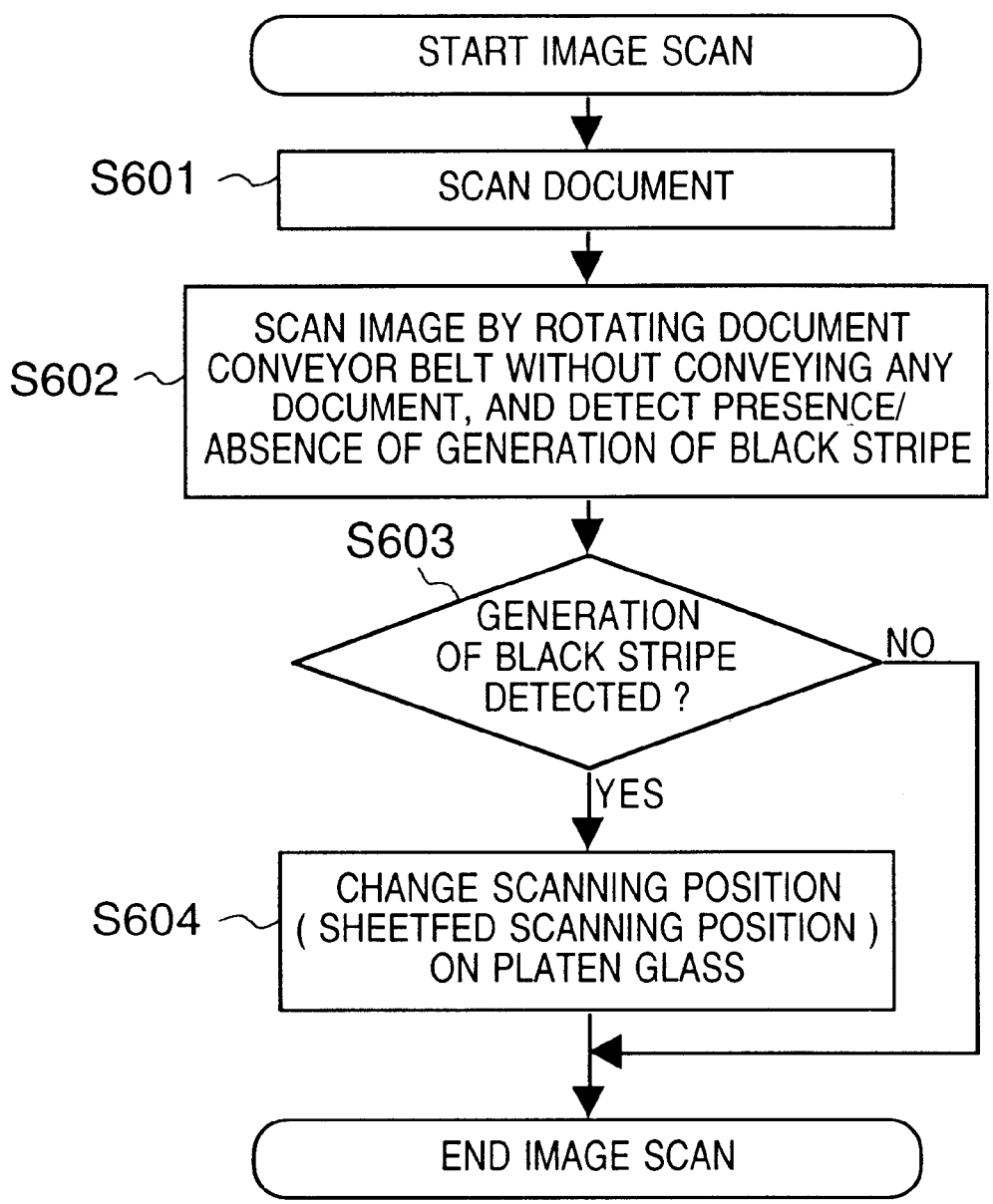
FIG. 4 is a flow chart executed when generation of a black stripe is detected after a document scan and the scanning position (sheetfed scanning position) is changed to prepare for the next document scan in the image scanning apparatus according to the first embodiment of the present invention.

The operation of the image scanning apparatus with the arrangement shown in FIG. 4 will be explained below. A signal output from the linear image sensor 401 is amplified at a predetermined gain by the amplifier 402, and is converted into a digital signal by the A/D converter 403. The shading correction circuit 404 performs shading correction and outputs an image signal. On the other hand, in the black stripe image detection circuit 405, the binarization circuit 406 converts the shading-corrected image signal into a binary signal by comparing it with a predetermined slice level. In this case, a signal which is smaller than the predetermined slice level is converted into a binary signal "1", and a signal which is larger than the slice level is converted into a binary signal "0".

After that, the adder 407 and line memory 408 accumulate the binary signals in units of pixels. Accumulation is made for a predetermined number of lines. In this case, lines which are to undergo accumulation may be successive lines or intermittent lines at N-line intervals. By accumulating binary image data in units of pixels in this way, when a black stripe is generated, the accumulated value of the corresponding pixel becomes very large.

The comparator 409 compares the accumulated value in units of pixels with the determination level, and determines generation of a black stripe for a pixel, the value of which has exceeded the determination level. The gate circuit 410 sends only period signal components of the effective region used for a document scan in the scanning region to the determination result holding circuit 411. When generation of a black stripe is determined even for only one pixel in the effective period, the determination result holding circuit 411 sends black stripe generation information to the CPU 412. Note that the number of lines that are to undergo accumulation, the line spacing of accumulation, and the effective period region all can be varied by the CPU 412.

Figure 7:
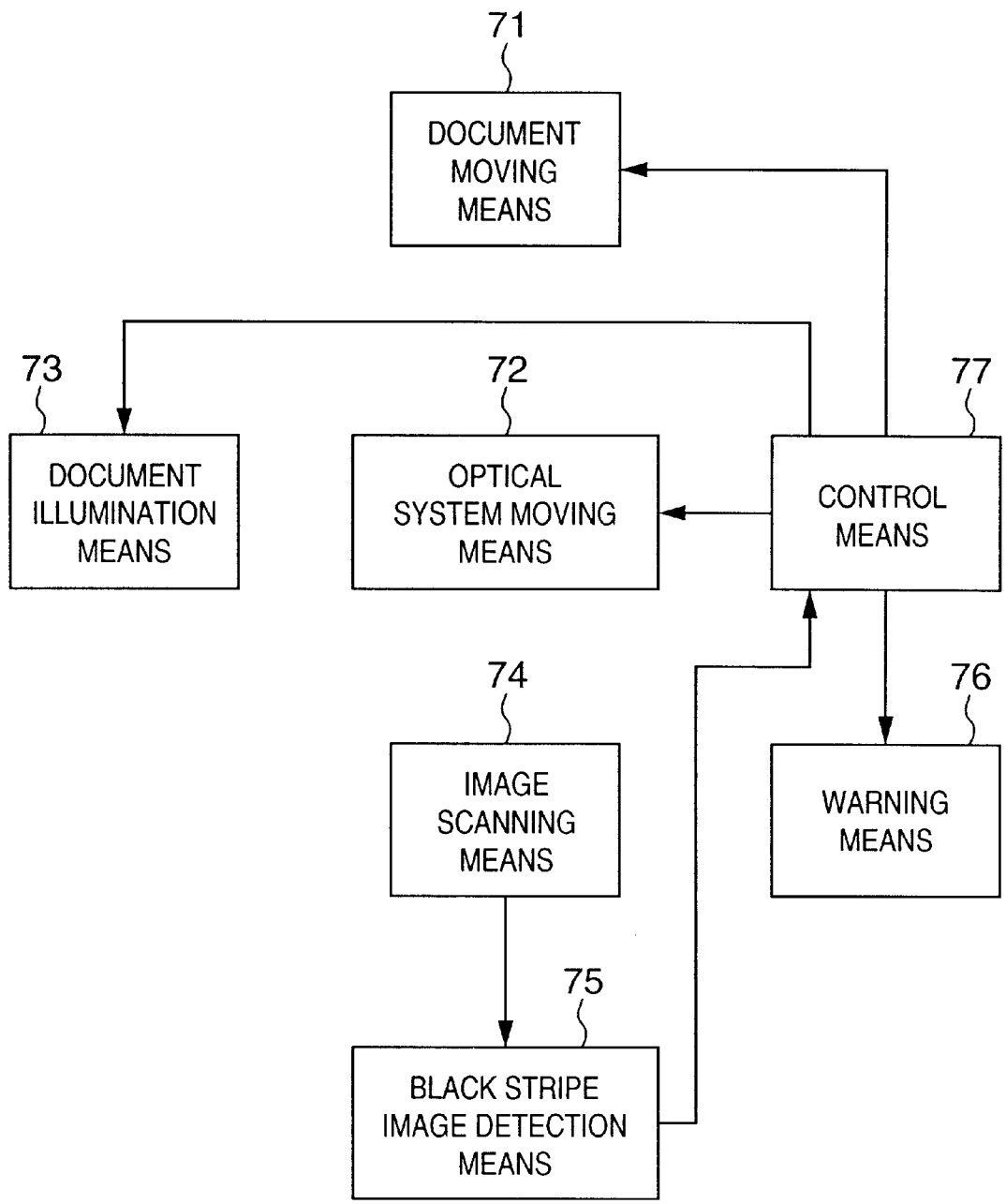
FIG. 7 is a functional block diagram showing the arrangement of principal part of the image scanning apparatus according to the first and second embodiments of the present invention in correspondence with the appended claims.

FIG. 7 is a functional block diagram showing the arrangement of principal part of the image scanning apparatus according to the first embodiment and the second embodiment (to be described later) of the present invention. The image scanning apparatus according to the first embodiment and the second embodiment (to be described later) of the present invention comprises a document moving means 71 (automatic document feeder), an optical system moving means 72 (mirror table driving mechanism), a document illumination means 73 (document illumination lamp), an image scanning means 74 (linear image sensor 401), a black stripe image detection means 75 (black stripe image detection circuit 405/705), a warning means 76 (warning mechanism), and a control means 77 (CPU 412, the driving controllers of the automatic document feeding mechanism/ document illumination mechanism/mirror table driving mechanism/warning mechanism controlled by the CPU 412, and a program of the present invention executed by the CPU 412).

The functions of the individual means will be explained below. The document moving means 71 is comprised of a document conveyor belt, belt driving means, and the like for moving a document on the platen glass in the sub-scan direction at a constant speed. The optical system moving means 72 moves/stops a mirror table for supporting the reflecting mirrors to scan a predetermined position on the platen glass. The document illumination means 73 illuminates a document that moves on the platen glass at the stop position of the mirror table. The image scanning means 74 scans an image from the document at the stop position of the mirror table. The black stripe image detection means 75 detects the presence/absence of generation of a black stripe image on the basis of an image signal output from the image scanning means 74. The warning means 76 generates a visual (or audible or both visual and audible) warning message indicating that dust or soil is attached to the platen glass surface when the black stripe image detection means 75 detects generation of a black stripe image. The control means 77 determines based on the detection result of the black stripe image detection means 75 if dust or soil is attached to the platen glass surface, and executes control for changing the stop position of the mirror table by the optical system moving means 72, and control for making the warning means 76 generate a warning message.

Furthermore, the black stripe image detection means 75 comprises a binarization means (binarization circuit 406) for binarizing an image signal, an accumulation means (adder 407, line memory 408) for accumulating binary data for a predetermined number of lines at N-line intervals (N: an arbitrary integer) in units of pixels, and a comparison means (comparator 409) for comparing the accumulation result with a predetermined determination level, and determining that a black stripe image is generated at the corresponding pixel position when the accumulation result has exceeded the determination level.

Furthermore, the black stripe image detection means 75 comprises a black signal thickening means (main-scan black signal thickening circuit 701) for selecting and outputting one, which has a smaller level, of signals obtained before and after an image signal is delayed by a predetermined number of pixels in the main scan direction in units of pixels, in addition to the binarization means, accumulation means, and comparison means.

Also, the black stripe image detection means 75 detects the presence/absence of generation of a black stripe image at a timing before a document scan by the image scanning means 74, i.e., detects the presence/absence of generation of a black stripe image using image data scanned by the image scanning means 74 at the predetermined position on the platen glass while moving the belt surface of the document conveyor belt that forms the document moving means 71 under the control of the control means 77.

Alternatively, the black stripe image detection means 75 detects the presence/absence of generation of a black stripe image at a timing after a document scan by the image scanning means 74, i.e., detects the presence/absence of generation of a black stripe image using image data scanned by the image scanning means 74 at the predetermined position on the platen glass while moving the belt surface of the document conveyor belt that forms the document moving means 71 under the control of the control means 77.

Alternatively, the black stripe image detection means 75 detects the presence/absence of generation of a black stripe image at a timing between neighboring documents upon scanning successive documents by the image scanning means 74, i.e., detects the presence/absence of generation of a black stripe image using image data scanned by the image scanning means 74 at the predetermined position on the platen glass while moving the belt surface of the document conveyor belt that forms the document moving means 71 under the control of the control means 77.

Figure 9:
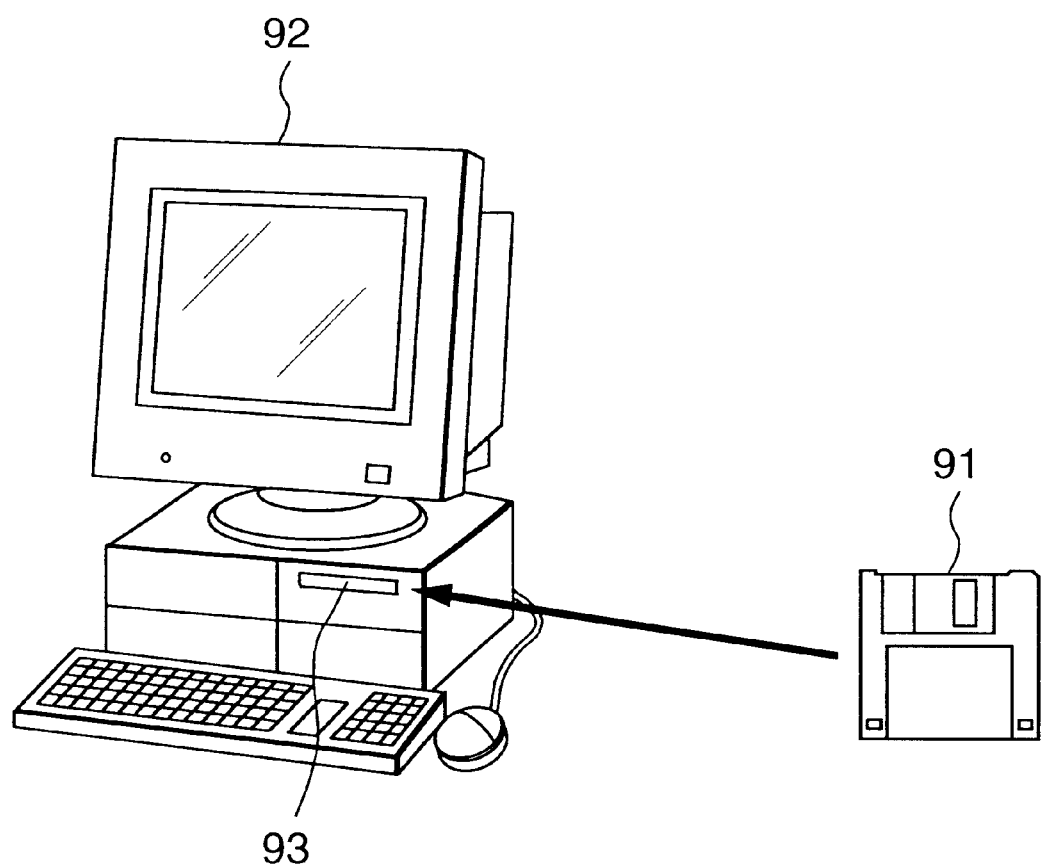
FIG. 9 is an explanatory view showing an example of the principle upon supplying the program and associated data according to the present invention from the storage medium to an apparatus.

FIG. 9 is an explanatory view showing an example of the principle upon supplying a program and associated data according to the present invention from a storage medium to an apparatus such as a computer. The program and associated data according to the present invention is supplied by inserting a storage medium 91 such as a floppy disk, CD-ROM, or the like into an insert slot 93 of a storage medium drive equipped in an apparatus 92. After that, the program and associated data according to the present invention are temporarily installed from the storage medium 91 on a hard disk and are then loaded from the hard disk onto a RAM or are directly loaded onto the RAM without being installed on the hard disk, thus executing the program and associated data according to the present invention.

In this case, upon executing the program of the present invention in the image scanning apparatus according to the first and second embodiments of the present invention, the program and associated data according to the present invention are supplied to the image scanning apparatus via an apparatus such as a computer or the like shown in, e.g., FIG. 9, or are pre-stored in the image scanning apparatus, thus allowing program execution.

Figure 8:
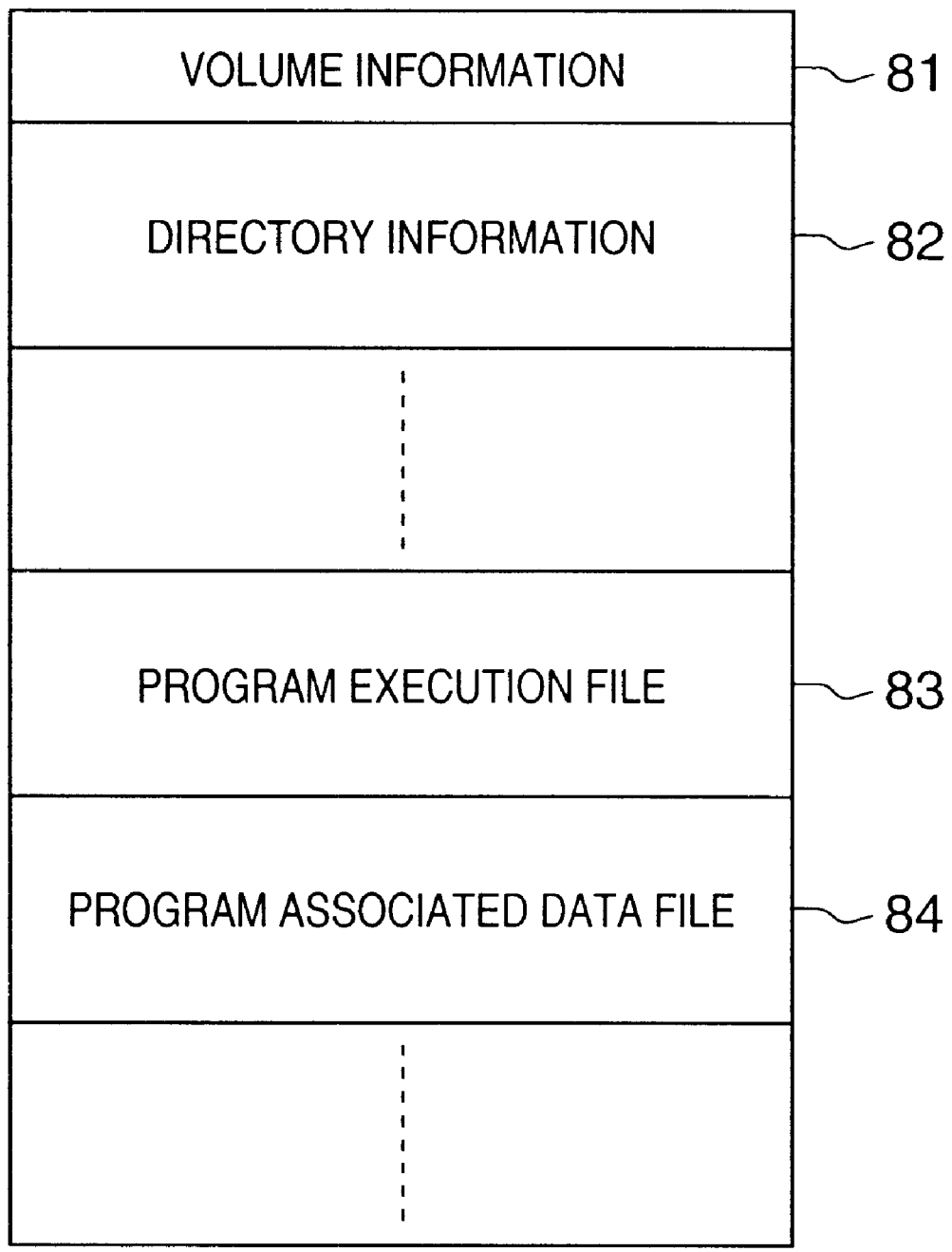
FIG. 8 is an explanatory view showing an example of the arrangement of the storage contents of a storage medium which stores a program and associated data according to the present invention.

FIG. 8 is an explanatory view showing an example of the arrangement of the storage contents of the storage medium that stores the program and associated data according to the present invention. The storage medium of the present invention has storage contents including, e.g., volume information 81, directory information 82, a program execution file 83, a program associated data file 84, and the like. The program of the present invention is converted into program codes on the basis of the flow charts shown in FIGS. 2 to 4 to be described below.

Figure 2:
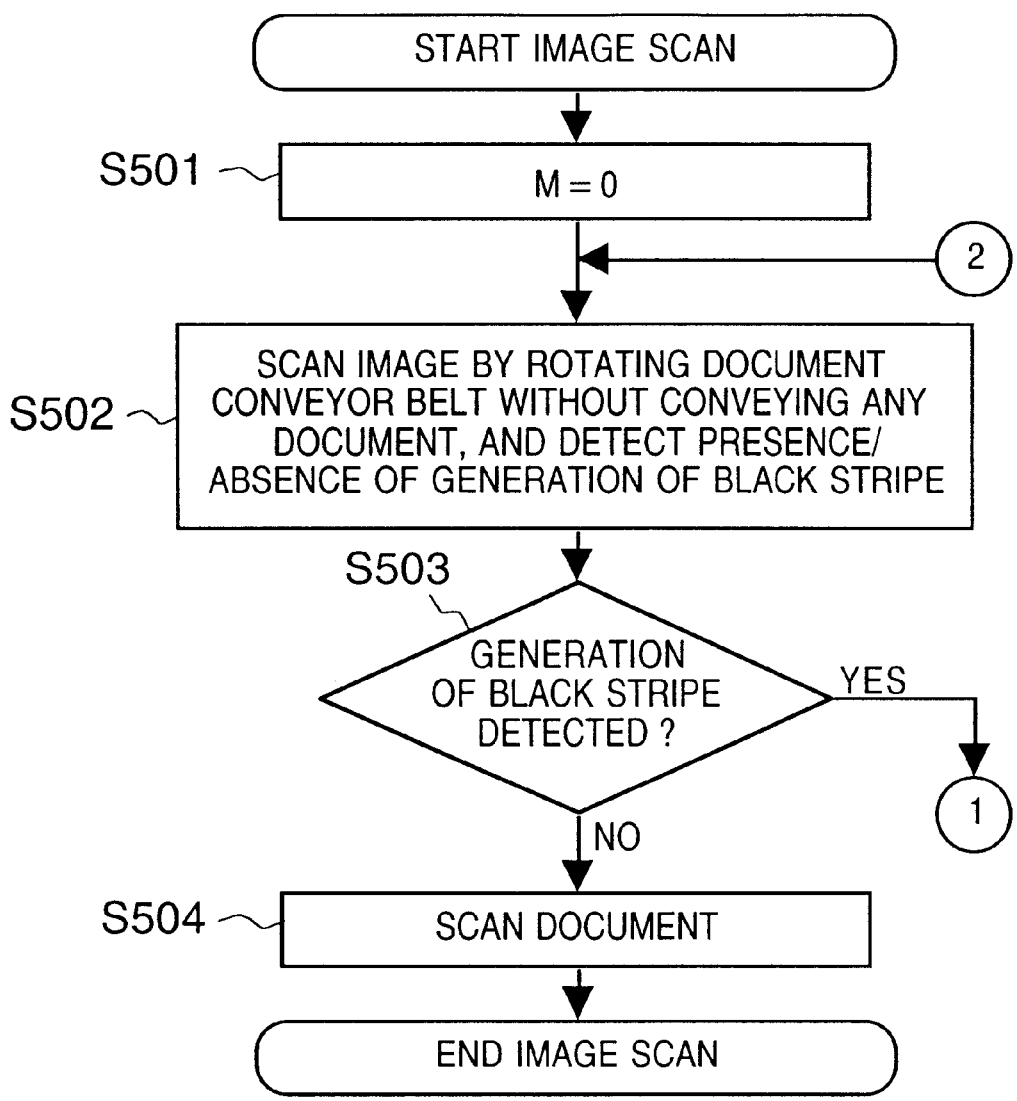
FIG. 2 is a flow chart executed when generation of a black stripe is detected and the scanning position (sheetfed scanning position) is changed prior to a document scan in the image scanning apparatus according to the first embodiment of the present invention.
Figure 3:
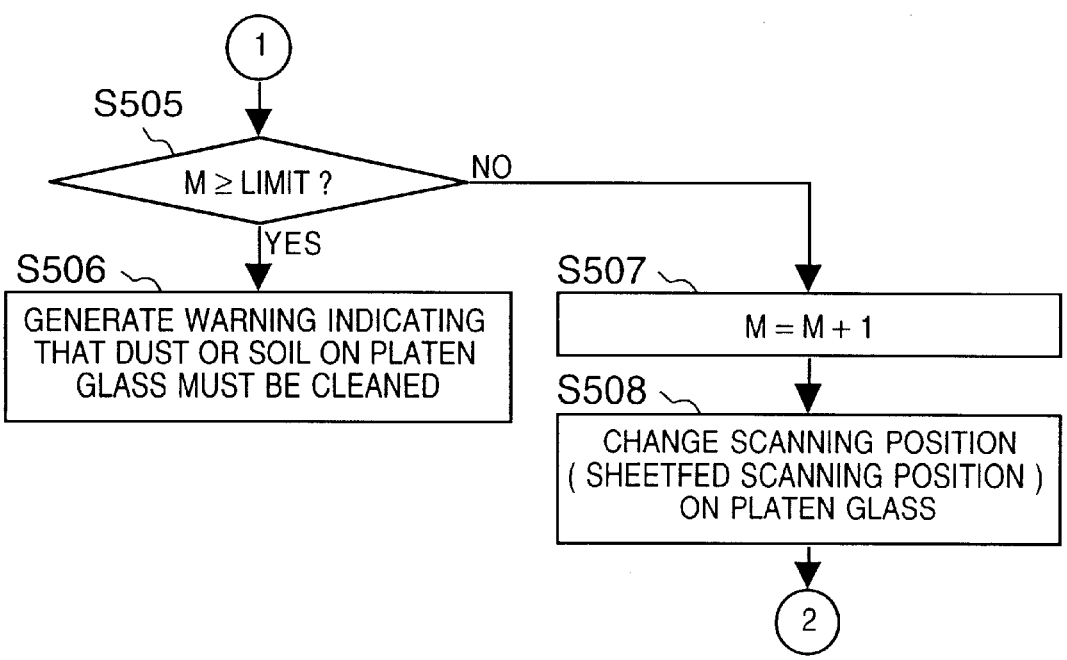
FIG. 3 is a flow chart executed when generation of a black stripe is detected and the scanning position (sheetfed scanning position) is changed prior to a document scan in the image scanning apparatus according to the first embodiment of the present invention.

The operation of the image scanning apparatus according to the first embodiment of the present invention with the aforementioned arrangement will be explained in detail below with reference to the flow charts in FIGS. 1, 2, and 3, and the flow chart in FIG. 4.

A control method of reducing the frequency of occurrence of generation of a black stripe image using the black stripe image detection circuit 405 in the image scanning apparatus according to the first embodiment of the present invention will be described below using the flow charts in FIGS. 2 and 3. FIGS. 2 and 3 are flow charts executed when generation of a black stripe is detected and the scanning position (sheetfed scanning position) is changed prior to a document scan in the image scanning apparatus according to the first embodiment of the present invention.

In step S501, a variable M is reset to zero. In step S502, the linear image sensor 401 scans an image (belt surface) prior to a document scan after the document conveyor belt of the automatic document feeder has been moved without conveying any document, and the black stripe image detection circuit 405 detects the presence/absence of generation of a black stripe. As a result, if no black stripe is detected, a document image is scanned in step S504, and this processing ends. On the other hand, if generation of a black stripe is detected, the variable M is compared with a predetermined LIMIT value in step S505.

If the variable M is smaller than the LIMIT value, M=M+1 (incremented) in step S507 and the sheetfed scanning position is changed in step S508. After the sheetfed scanning position is changed, the flow returns to step S502 to execute a process for detecting the presence/absence of generation of a black stripe. If this operation is repeated for a number of times equal to or larger than the LIMIT value, since M becomes equal to or larger than the LIMIT value, the sheetfed scanning position is not changed any more in such case, and a warning message indicating that dust or soil is attached to the platen glass surface is generated in step S506.

A control method of detecting generation of a black stripe after a document scan, and changing the scanning position (sheetfed scanning position) to prepare for the next document scan in the image scanning apparatus according to the present invention will be explained below with reference to the flow chart in FIG. 4. FIG. 4 is a flow chart executed when generation of a black stripe is detected after a document scan and the scanning position (sheetfed scanning position) is changed to prepare for the next document scan in the image scanning apparatus according to the first embodiment of the present invention.

Upon completion of a document scan by the linear image sensor in step S601, the linear image sensor 401 scans an image (belt surface) prior to a document scan after the document conveyor belt of the automatic document feeder has been moved without conveying any document, and the black stripe image detection circuit 405 detects the presence/absence of generation of a black stripe in step S602. As a result, if no black stripe is detected, this processing ends. However, if generation of a black stripe is detected, the sheetfed scanning position is changed in step S604 to prepare for the next document scan, and this processing then ends.

Two different control examples have been explained. In either example, whether or not a black stripe is generated is detected by scanning the belt surface of the document conveyor belt of the automatic document feeder. Such control is done under the assumption that the color of the document conveyor belt is white, and no black stripe is detected by scanning the belt surface unless any dust is present at the sheetfed scanning position. If the document conveyor belt is not white, the presence/absence of generation of a black stripe cannot be correctly detected by the aforementioned method. In this case, the presence/absence of generation of a black stripe may be determined based on a signal obtained by actually scanning a document. However, since the detected black stripe may be an image itself on the document, detection errors probability increases in that case.

As described above, since the image scanning apparatus according to the first embodiment of the present invention comprises the linear image sensor 401 for scanning an image at the stop position of the mirror table from a document that moves at a constant speed, the black stripe image detection circuit 405 for detecting the presence/absence of generation of a black stripe image on the basis of an image signal, and the CPU 412 for making the control for moving the document on the platen glass in the sub-scan direction at a constant speed, the control for moving/stopping the mirror table that supports reflected light guide mirrors to scan a predetermined position on the platen glass, the control for illuminating the document that moves on the glass at the stop position of the mirror table, the control for determining that dust or soil is attached to the platen glass surface upon detection of generation of a black stripe image, and changing the stop position of the mirror table, and the control for displaying a warning message, the following operations and effects are expected.

In the above arrangement, the linear image sensor 401 scans an image (belt surface) prior to a document scan while only the document conveyor belt of the automatic document feeder has been moved without conveying any document, and the black stripe image detection circuit 405 detects the presence/absence of generation of a black stripe. Upon detection of generation of a black stripe, the sheetfed scanning position is changed, and a warning message indicating the presence of dust or soil on the platen glass surface is generated. Alternatively, the linear image sensor 401 scans an image (belt surface) after a document scan while only the document conveyor belt of the automatic document feeder has been moved without conveying any document, and the black stripe image detection circuit 405 detects the presence/absence of generation of a black stripe. Upon detection of generation of a black stripe, the sheetfed scanning position is changed to prepare for the next document scan.

Therefore, in the first embodiment of the present invention, in the sheetfed scanning mode in which the mirror table is moved to scan the predetermined position on the platen glass and a document image is read while moving the document at a constant speed, generation of a black stripe due to dust or soil on the platen glass is detected, and the control for changing the sheetfed scanning position and the control for displaying a warning message indicating that dust or soil is attached to the platen glass surface can be done in accordance with the detection result. Hence, the frequency of occurrence of generation of a black stripe can be reduced compared to the conventional apparatus.

Second Embodiment

Figure 5:
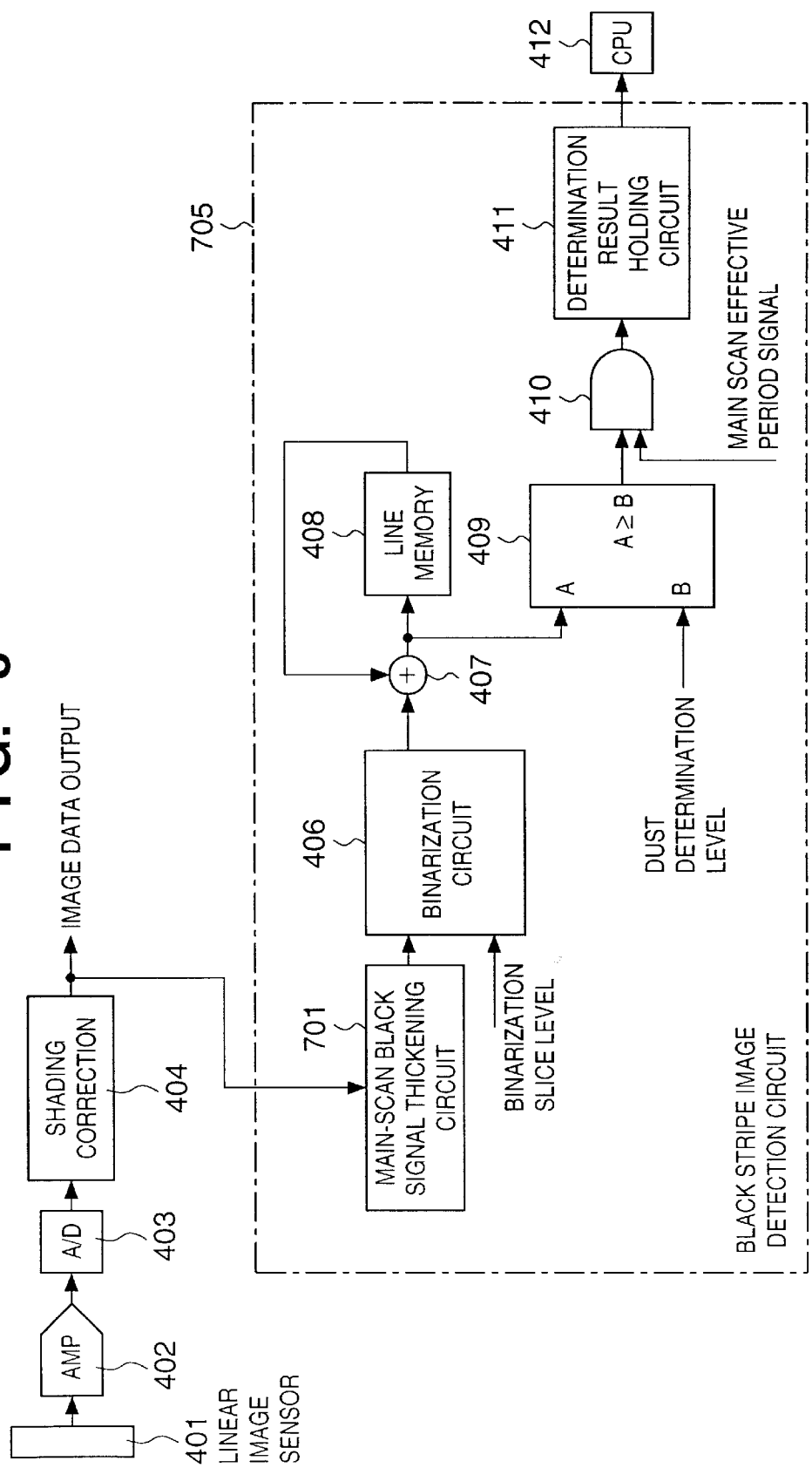
FIG. 5 is a block diagram showing an example of the arrangement of a control system including a black stripe image detection circuit in an image scanning apparatus according to the second embodiment of the present invention.

FIG. 5 is a block diagram showing an example of the arrangement of a control system including a black stripe image detection circuit in an image scanning apparatus according to the second embodiment of the present invention. The control system of the image scanning apparatus according to the second embodiment of the present invention mainly comprises a linear image sensor 401, amplifier 402, A/D converter 403, shading correction circuit 404, black stripe image detection circuit 705, and CPU 412. Furthermore, the black stripe image detection circuit 705 comprises a main-scan black signal thickening circuit 701, binarization circuit 406, adder 407, line memory 408, comparator 409, gate circuit 410, and determination result holding circuit 411.

The second embodiment of the present invention is substantially the same as the first embodiment except that the main-scan black signal thickening circuit 701 is added before the binarization circuit 405 in the black stripe image detection circuit 705. Hence, the same reference numerals denote the same parts, and a detailed description thereof will be omitted.

Figure 6:
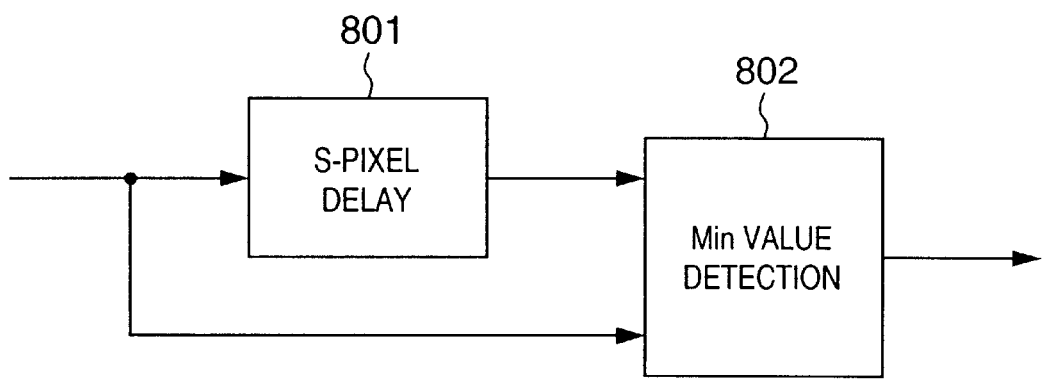
FIG. 6 is a block diagram showing an example of the arrangement of a main-scan black signal thickening circuit in the image scanning apparatus according to the second embodiment of the present invention.

FIG. 6 is a block diagram showing an example of the arrangement of the main-scan black signal thickening circuit 701 in the image scanning apparatus according to the second embodiment of the present invention shown in FIG. 5. The main-scan black signal thickening circuit 701 in the image scanning apparatus according to the second embodiment of the present invention comprises an S-pixel DELAY circuit 801 and Min value detection circuit 802.

Figure 10:
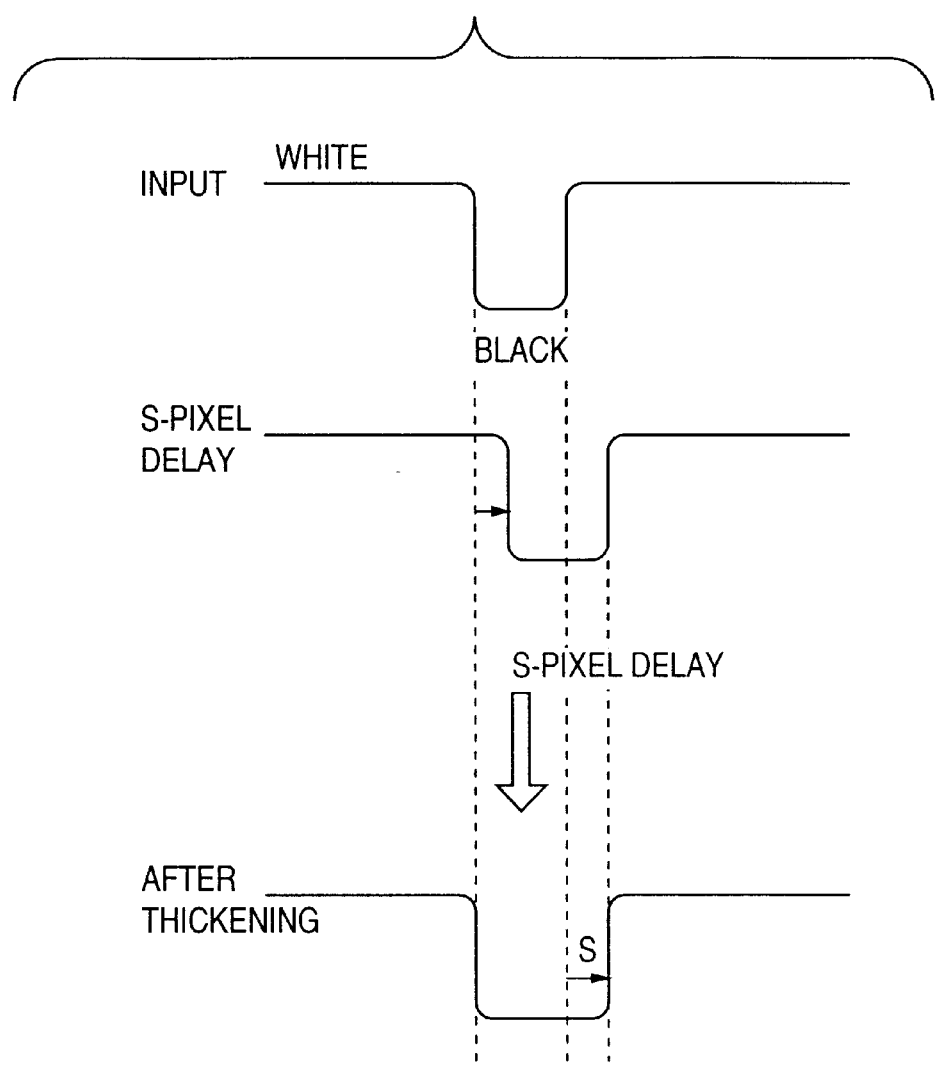
FIG. 10 is a waveform chart for explaining the operation of the black signal thickening circuit in the image scanning apparatus according to the second embodiment of the present invention.

The functions of these circuits will be explained in detail below. The S-pixel DELAY circuit 801 has a function of delaying an image signal by S pixels in the main scan direction. The Min value detection circuit 802 has a function of selecting and outputting, in units of pixels, a smaller one of signals obtained before and after an image signal is delayed by S pixels in the main scan direction. In this case, as shown in, e.g., FIG. 10, by delaying the input image signal by S pixels, a black signal can be thickened by S pixels.

The operation of the image scanning apparatus according to the second embodiment of the present invention with the above arrangement will be described in detail below with reference to FIGS. 5 and 6.

In the image scanning apparatus according to the second embodiment of the present invention, the main-scan black signal thickening circuit 701 in the black stripe image detection circuit 705 selects and outputs, using the S-pixel DELAY circuit 801 and Min value detection circuit 802, one with a smaller signal level of signals obtained before and after an image signal is delayed by S pixels in the main scan direction, thus making control for thickening a black signal by S pixels.

The main-scan black signal thickening circuit 701 shown in FIG. 6 is added to the black stripe image detection circuit 705 of the image scanning apparatus for the following reason. That is, when dust attached to the platen glass is a fragment of a thread or the like, a black stripe generated due to the influence of dust does not become straight but blurred in the main scan direction upon movement of the document conveyor belt of the automatic document feeder. In such case, when black stripe detection is made after a black signal is thickened, the influence of blur can be reduced, and the detection performance of black stripe generation can be improved.

Figure 12:
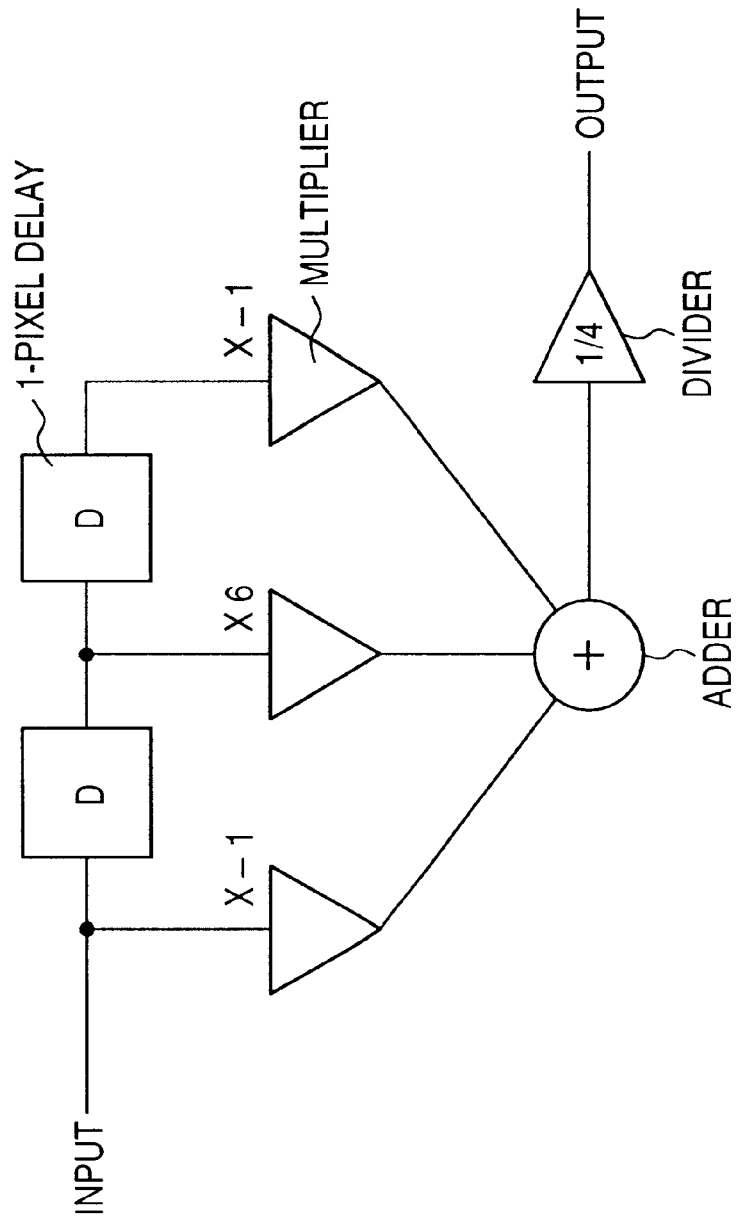
FIG. 12 is a block diagram showing an example of an FIR filter that implements the edge emphasis process in the image scanning apparatus according to the second embodiment of the present invention.
Figure 13:
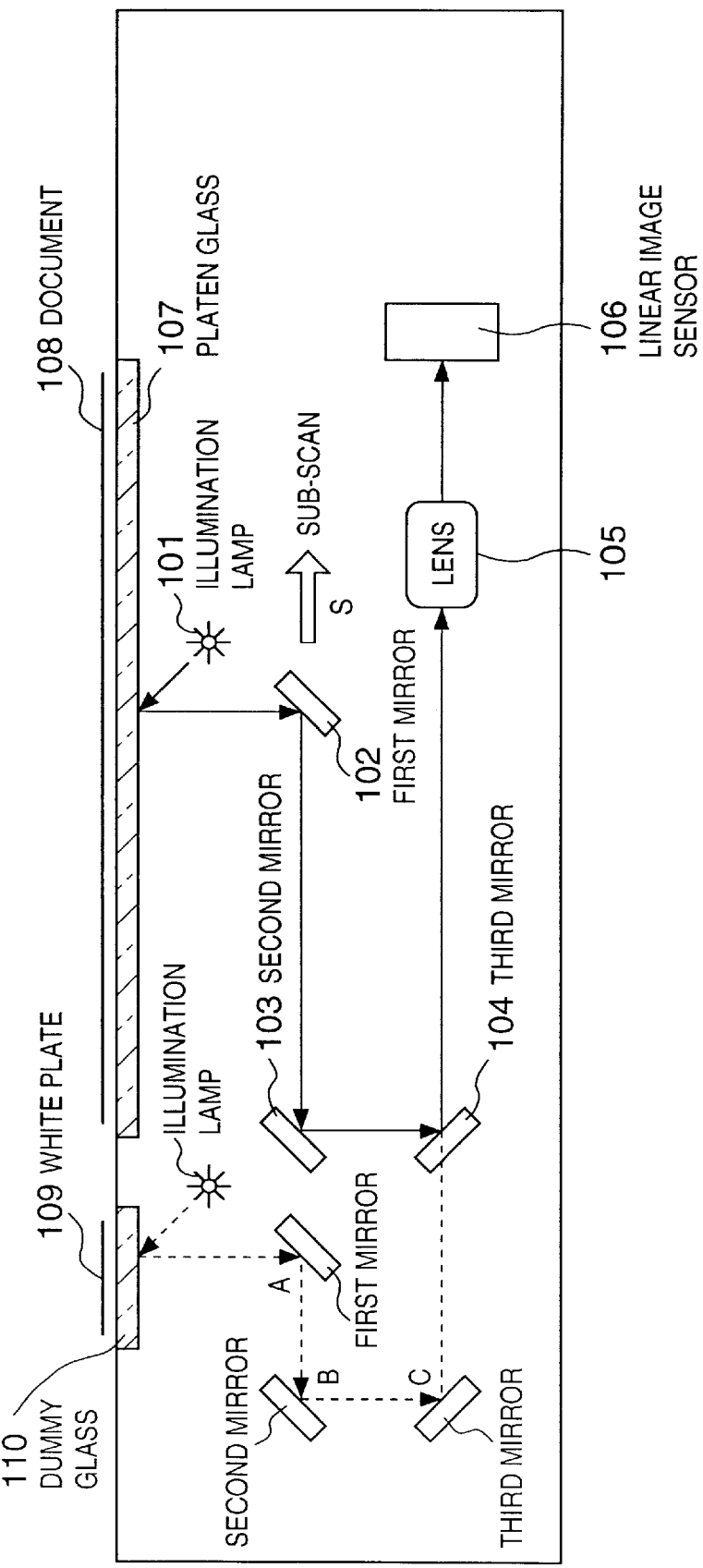
FIG. 13 is a sectional view showing an example of the arrangement of a conventional image scanning apparatus.
Figure 14:
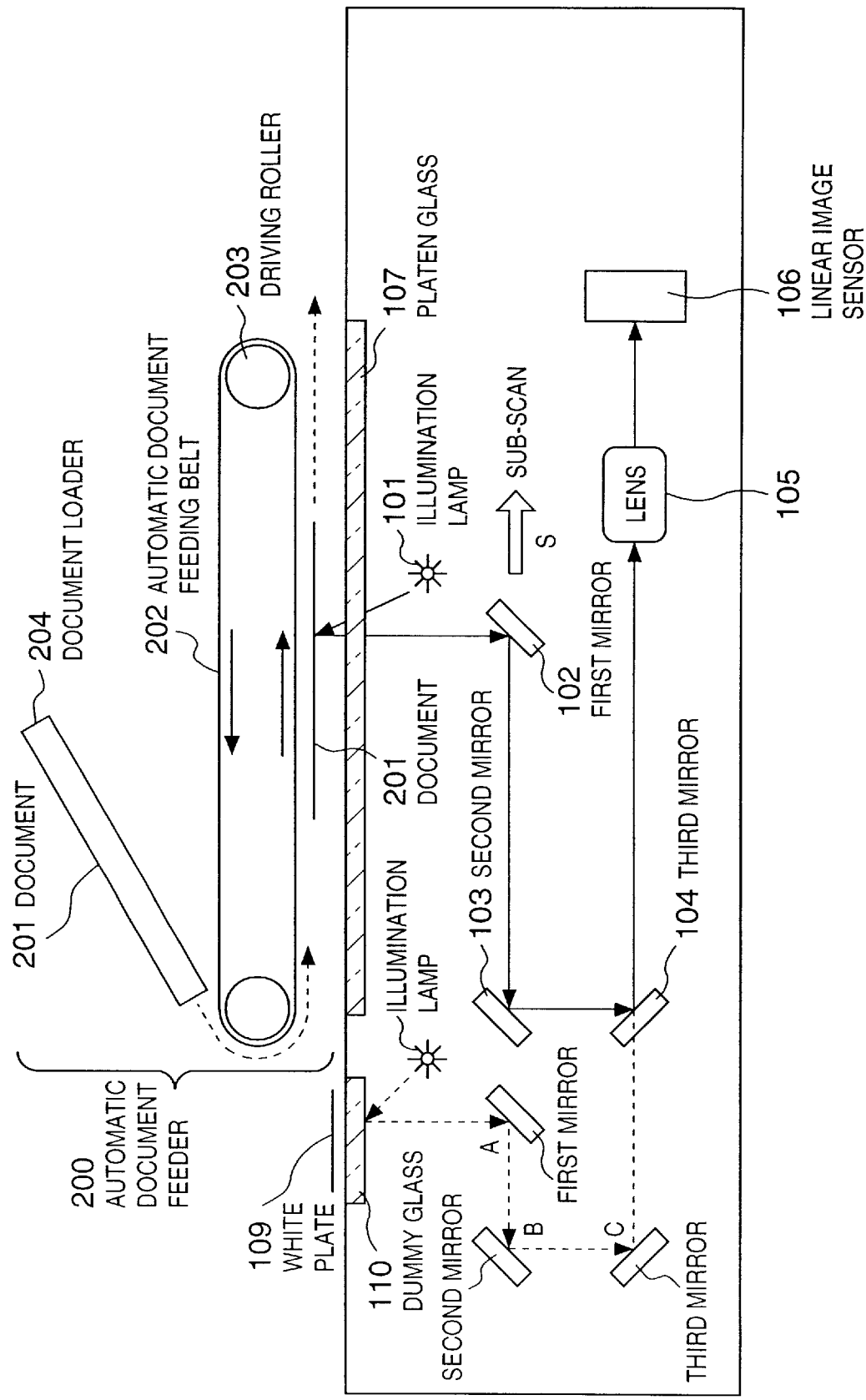
FIG. 14 is a sectional view showing an example of the arrangement of a conventional image scanning apparatus.

When the black level also drifts due to blurring of the black signal in the main scan direction, it is effective to execute edge emphasis in place of the black signal thickening process. For example, the amplitude of the black signal becomes too small due to blurring to be binarized, as shown in FIG. 11. In such case, if edge emphasis is done, the amplitude can be increased, and the black signal can be binarized accurately. Edge emphasis can be implemented by an FIR (Finite Impulse Response) filter, as shown in, e.g., FIG. 12.

As described above, since the image scanning apparatus according to the first embodiment of the present invention comprises the linear image sensor 401 for scanning an image at the stop position of the mirror table from a document that moves at a constant speed, the black stripe image detection circuit 705 which has the main-scan black signal thickening circuit 701 that selects and outputs one with a smaller signal level of signals obtained before and after an image signal is delayed by S pixels in the main scan direction, and which detects the presence/absence of generation of a black stripe image on the basis of an image signal, and the CPU 412 for making the control for moving the document on the platen glass in the sub-scan direction at a constant speed, the control for moving/stopping the mirror table that supports reflected light guide mirrors to scan a predetermined position on the platen glass, the control for illuminating the document that moves on the glass at the stop position of the mirror table, the control for determining that dust or soil is attached to the platen glass surface upon detection of generation of a black stripe image, and changing the stop position of the mirror table, and the control for displaying a warning message, the following operations and effects are expected.

In the above arrangement, in addition to the control in the first embodiment, the main-scan black signal thickening circuit 701 in the black stripe image detection circuit 705 selects and outputs one with a smaller signal level of signals obtained before and after an image signal is delayed by S pixels in the main scan direction, thus making control for thickening the black signal by S pixels.

Therefore, in the second embodiment of the present invention, in the sheetfed scanning mode in which the mirror table is moved to scan the predetermined position on the platen glass and a document image is read while moving the document at a constant speed, generation of a black stripe due to dust or soil on the platen glass is detected, and the control for changing the sheetfed scanning position and the control for displaying a warning message indicating that dust or soil is attached to the platen glass surface can be done in accordance with the detection result as in the first embodiment. Hence, the frequency of occurrence of generation of a black stripe can be reduced compared to the conventional apparatus.

Another Embodiment

In the first and second embodiments of the present invention, a standalone image scanning apparatus has been explained, but the present invention is not limited to such specific apparatus. For example, the present invention can also be applied to an image forming apparatus (copying machine) which mounts the image scanning apparatus of the present invention and forms an image on a recording medium such as a recording sheet or the like on the basis of a scanned image.

Also, in the first and second embodiments of the present invention, a standalone image scanning apparatus has been explained, but the present invention is not limited to such specific apparatus. For example, the present invention can also be applied to an image forming system that connects an image forming apparatus (copying machine) which mounts the image scanning apparatus of the present invention and forms an image on a recording medium such as a recording sheet or the like on the basis of a scanned image, and an external apparatus such as an information processing apparatus (computer) or the like.

Note that the present invention may be applied to either a system constituted by a plurality of devices, or an apparatus consisting of a single equipment. The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the image scanning apparatus of the present invention, in the sheetfed scanning mode in which an optical system (mirror table) is moved to scan the predetermined position on the platen glass and a document image is read while moving the document by the optical system moving means at a constant speed, generation of a black stripe due to dust or soil on the platen glass is detected, and the control for changing the sheetfed scanning position and the control for displaying a warning message indicating that dust or soil is attached to the platen glass surface can be done in accordance with the detection result. Hence, frequency of occurrence of generation of a black stripe can be reduced compared to the conventional apparatus.

According to the image forming apparatus of the present invention, since the image forming apparatus mounts the image scanning apparatus of the present invention, the frequency of occurrence of generation of a black stripe can be reduced in the image forming apparatus that mounts the image scanning apparatus, compared to the conventional apparatus.

Also, according to the image forming system of the present invention, since the image forming system is built by the image scanning apparatus of the present invention and an external apparatus such as an information processing apparatus or the like, the frequency of occurrence of generation of a black stripe can be reduced in the image forming system that connects the image scanning apparatus and external apparatus, compared to the conventional apparatus.

Furthermore, according to the image scanning control method of the present invention, since the image scanning apparatus executes the image scanning control method, the frequency of occurrence of generation of a black stripe can be reduced compared to the conventional apparatus.

Moreover, according to the storage medium of the present invention, since the image scanning apparatus reads out the image scanning control method from the storage medium, and executes it, the frequency of occurrence of generation of a black stripe can be reduced compared to the conventional apparatus.

As many apparently widely different embodiments of the present invention can be made without departing from the spirit and scope thereof, it is to be understood that the invention is not limited to the specific embodiments thereof except as defined in the claims.

What is claimed is:

1. An image scanning apparatus for scanning an image while moving a document on a document table, comprising:
   a delay unit adapted to delay an image data by a predetermined number of pixels in a main scan direction:
   a selecting unit adapted to select and output smaller one of data obtained before and after the image data which is delayed by the predetermined number of pixels in the main scanning direction by said delay unit;
   a black stripe image detection unit adapted to detect the presence/absence of generation of a black stripe image on the basis of output of said selecting unit; and
   a controller adapted to change an image reading position when said black stripe image detection unit detects the generation of a black stripe image.

2. The apparatus according to claim 1, further comprising:
   a document moving unit adapted to move the document on the document table in a sub-scan direction;
   an image scanning unit adapted to scan from the document; and
   a moving unit adapted to move said image scanning unit along the document table to change the image reading position.

3. The apparatus according to claim 2, wherein a timing at which said black stripe image detection unit detects the presence/absence of generation of the black stripe image is set before a document scan by said image scanning unit, and said black stripe image detection unit detects the presence/absence of generation of the black stripe image using image data scanned at the predetermined position on the document table by said image scanning unit while activating a document moving unit.

4. The apparatus according to claim 2, wherein a timing at which said black stripe image detection unit detects the presence/absence of generation of the black stripe image is set after a document scan by said image scanning unit, and said black stripe image detection unit detects the presence/absence of generation of the black stripe image using image data scanned at the predetermined position on the document table by said image scanning unit while activating a document moving unit.

5. The apparatus according to claim 2,
   wherein a timing at which said black stripe image detection unit detects the presence/absence of generation of the black stripe image is set between neighboring documents upon successively scanning documents by said image scanning unit and said black stripe image detection unit detects the presence/absence of generation of the black stripe image using image data scanned at the predetermined position on the document table by said image scanning unit while activating a document moving unit.

6. The apparatus according to claim 1, further comprising:
  a binarization unit adapted to binarize the output data of said selecting unit; and
  an accumulation unit adapted to accumulate the output data binarized by said binarization unit for a predetermined number of lines in units of pixels,
  wherein said black stripe image detection unit compares the accumulation result with a predetermined determination level, and determines that a black stripe image is generated at the corresponding pixel position when the accumulation result has exceeded the determination level.

7. The apparatus according to claim 1, further comprising a warning unit adapted to warn when said black stripe image detection unit detects generation of the black stripe image.

8. An image forming apparatus which mounts an image scanning apparatus for scanning an image while moving a document on a document table, and forms an image on a recording medium such as a recording sheet or the like on the basis of the scanned image,
  said image scanning apparatus comprising:
    a delay unit adapted to delay an image data by a predetermined number of pixels in a main scan direction:
    a selecting unit adapted to select and output smaller one of data obtained before and after the image data which is delayed by the predetermined number of pixels in the main scanning direction by said delay unit;
    a black stripe image detection unit adapted to detect the presence/absence of generation of a black stripe image on the basis of output of said selecting unit; and
    a controller adapted to change an image reading position when said black stripe image detection unit detects the generation of a black stripe image.

9. An image forming system that connects an image forming apparatus which mounts an image scanning apparatus for scanning an image while moving a document on a document table, and forms an image on a recording medium such as a recording sheet or the like on the basis of the scanned image, and an external apparatus such as an information processing apparatus or the like,
  said image scanning apparatus mounted in said image forming apparatus comprising:
    a delay unit adapted to delay an image data by a predetermined number of pixels in a main scan direction;
    a selecting unit adapted to select and output smaller one of data obtained before and after the image data which is delayed by the predetermined number of pixels in the main scanning direction by said delay unit;
    a black stripe image detection unit adapted to detect means for detecting the presence/absence of generation of a black stripe image on the basis of output of said selecting unit; and
    a controller adapted to change an image reading position when said black stripe image detection unit detects the generation of a black stripe image.

10. An image scanning control method applied to an image scanning apparatus for scanning an image while moving a document on a document table, comprising:
  the delay step of delaying an image data by a predetermined number of pixels in a main scan direction;
  the selecting step selecting and outputting smaller one of data obtained before and after the image data which is delayed by the predetermined number of pixels in the main scanning direction by said delay step;
  the black stripe image detection step of detecting the presence/absence of generation of a black stripe image on the basis of output of said selecting step; and
  the control step of changing an image reading position when said black stripe image detection unit detects the generation of a black stripe image.

11. The method according to claim 10, further comprising:
  the document moving step of moving the document on the document table in a sub-scan direction;
  the image scanning step of scanning document by using a image scanning unit; and
  the moving step of moving said image scanning unit along the document table to change the image reading position.

12. The method according to claim 11, wherein a timing at which the presence/absence of generation of the black stripe image is detected in the black stripe image detection step is set before a document scan in the image scanning step, and the presence/absence of generation of the black stripe image is detected in the black stripe image detection step using image data scanned at the predetermined position on the document table in the image scanning step while activating a document moving unit.

13. The method according to claim 11, wherein a timing at which the presence/absence of generation of the black stripe image is detected in the black stripe image detection step is set after a document scan in the image scanning step, and the presence/absence of generation of the black stripe image is detected in the black stripe image detection step using image data scanned at the predetermined position on the document table in the image scanning step while activating a document moving unit.

14. The method according to claim 11, wherein a timing at which the presence/absence of generation of the black stripe image is detected in the black stripe image detection step is set between neighboring documents upon successively scanning documents in the image scanning step, and the presence/absence of generation of the black stripe image is detected in the black stripe image detection step using image data scanned at the redetermined position on the document table in the image scanning step while activating a document moving unit.

15. The method according to claim 10, further comprising:
  the binarization step of binarizing the output data of said selecting step; and
  the accumulation step of accumulating the output data binarized in said binarization step for a predetermined number of lines in units of pixels,
  wherein said black stripe image detection step compares the accumulation result with a predetermined determination level, and determines that a black stripe image is generated at the corresponding pixel position when the accumulation result has exceeded the determination level.

16. The method according to claim 10, further comprising the warning step of warning when generation of the black stripe image is detected in the black stripe image detection step.

17. A computer readable storage medium which stores a program module for executing an image scanning control method applied to an image scanning apparatus for scanning an image while moving a document on a document table, said program module comprising:

a delay module for delaying an image data by a predetermined number of pixels in a main scan direction, a selecting module for selecting and outputting smaller one of data obtained before and after the image data which is delayed by the predetermined number of pixels in the main scanning direction by said delay module:

a black stripe image detection module for controlling to detect the presence/absence of generation of a black stripe image on the basis of output of said selecting module; and a control module for controlling to change an image reading position when said black stripe image detection module detects the generation of a black stripe image.

18. The medium according to claim 17, wherein said program module further comprises:

a document moving module for controlling to move the document on the document table in a sub-scan direction;

an image scanning module for controlling to scan the document by using an image scanning unit; and a moving module for controlling to move said image scanning unit along the document table to change the image reading position.

19. The medium according to claim 18, wherein a timing at which the black stripe image detection module detects the presence/absence of generation of the black stripe image is set before a document scan by the image scanning module, and the presence/absence of generation of the black stripe image is detected by the black stripe image detection module using image data scanned at the predetermined position on the document table by the image scanning module while activating a document moving unit.

20. The medium according to claim 18, wherein a timing at which the black stripe image detection module detects the presence/absence of generation of the black stripe image is set after a document scan by the image scanning module, and the presence/absence of generation of the black stripe image is detected by the black stripe image detection module using image data scanned at the predetermined position on the document table by the image scanning module while activating a document moving unit.

21. The medium according to claim 18, wherein a timing at which the black stripe image detection module detects the presence/absence of generation of the black stripe image is set between neighboring documents upon successively scanning documents by said image scanning module, and the presence/absence of generation of the black stripe image is detected by the black stripe image detection module using image data scanned at the predetermined position on the document table by the image scanning module while activating a document moving unit.

22. The medium according to claim 17, further comprising:

a binarization module for binarizing the output data of said selecting module; and an accumulation module for accumulating the output data binarized by said binarization module for a predetermined number of lines in units of pixels, wherein said black stripe image detection module compares the accumulation result with a predetermined determination level, and determines that a black stripe image is generated at the corresponding pixel position when the accumulation result has exceeded the determination level.

23. The medium according to claim 17, wherein said program module further comprises a warning module for controlling a warning when the black stripe image detection module detects generation of the black stripe image.

* * * * *

UNITED STATES PATENT AND TRADEMARK OFFICE
CERTIFICATE OF CORRECTION

PATENT NO. : 6,750,990 B1
DATED : June 15, 2004
INVENTOR(S) : Kazuhito Ohashi

It is certified that error appears in the above-identified patent and that said Letters Patent is hereby corrected as shown below:

Column 16,
Line 19, delete "direction:" and insert -- direction; --
Line 62, delete "unit" and insert -- unit, and --

Column 17,
Line 55, delete "means for detecting"

Column 18,
Line 43, delete "redetermined" and insert -- predetermined --

Column 19,
Line 2, delete "direction," and insert -- direction; --
Line 7, delete "module:" and insert -- module; --

Signed and Sealed this

Twenty-second Day of March, 2005

JON W. DUDAS
*Director of the United States Patent and Trademark Office*